United States Patent
Anspaugh et al.

[11] Patent Number: 5,911,438
[45] Date of Patent: Jun. 15, 1999

[54] ENERGY ABSORBER FOR STEERING COLUMN

[75] Inventors: Michael Patrick Anspaugh; Ray Garnet Armstrong, both of Bay City; James Anthony Smazenka, Midland, all of Mich.

[73] Assignee: General Motors Corporation, Detroit, Mich.

[21] Appl. No.: 09/036,676

[22] Filed: Mar. 9, 1998

[51] Int. Cl.[6] .................................. B62D 1/11; B62D 1/18
[52] U.S. Cl. ............................................ 280/777; 280/775
[58] Field of Search .................................. 280/777, 775, 280/779; 188/371, 374, 377; 74/492, 493

[56] References Cited

U.S. PATENT DOCUMENTS

| | | | |
|---|---|---|---|
| 3,392,599 | 7/1968 | White | 74/492 |
| 3,538,783 | 11/1970 | Butts | 74/492 |
| 3,590,655 | 7/1971 | Farrell et al. | 74/492 |
| 3,696,891 | 10/1972 | Poe | 188/1 C |
| 3,757,601 | 9/1973 | Burke | 74/492 |
| 3,788,148 | 1/1974 | Connell et al. | 74/492 |
| 3,820,634 | 6/1974 | Poe | 188/1 C |
| 4,445,708 | 5/1984 | Oakes et al. | 280/777 |
| 4,509,386 | 4/1985 | Kimberlin | 74/492 |
| 4,805,478 | 2/1989 | Beauch | 74/492 |
| 4,867,003 | 9/1989 | Beauch et al. | 74/492 |
| 5,342,091 | 8/1994 | Hancock | 280/777 |
| 5,669,634 | 9/1997 | Heinzman et al. | 280/777 |

*Primary Examiner*—Lanna Mai
*Assistant Examiner*—Jason S. Brooks
*Attorney, Agent, or Firm*—Dean L. Ellis; Robert M. Sigler

[57] ABSTRACT

An energy absorber including a yoke on a vehicle body pivotable about a lateral centerline thereof, a linear bore in the yoke surrounding a steering column mast jacket, a ball sleeve between the mast jacket and the linear bore, a plurality of steel spheres interference fitted between the mast jacket and the linear bore and loosely received in apertures in the ball sleeve, and an annular lip on the yoke. The interference fit of the steel spheres yields a rigid, lash-free connection between the vehicle body and a lower end of the mast jacket. An impact on the steering column induces linear translation of the mast jacket through the linear bore. The ball sleeve is trapped in the linear bore by the annular lip on the yoke. The steel spheres are held stationary by the apertures in the ball sleeve and plastically deform the mast jacket by plowing tracks therein to convert into work a fraction of the kinetic energy of the impact on the steering column. The interference fit of the steel spheres prevents tipping of the mast jacket relative to the yoke and pivots the yoke as a unit with the steering column to prevent binding of the mast jacket.

3 Claims, 1 Drawing Sheet

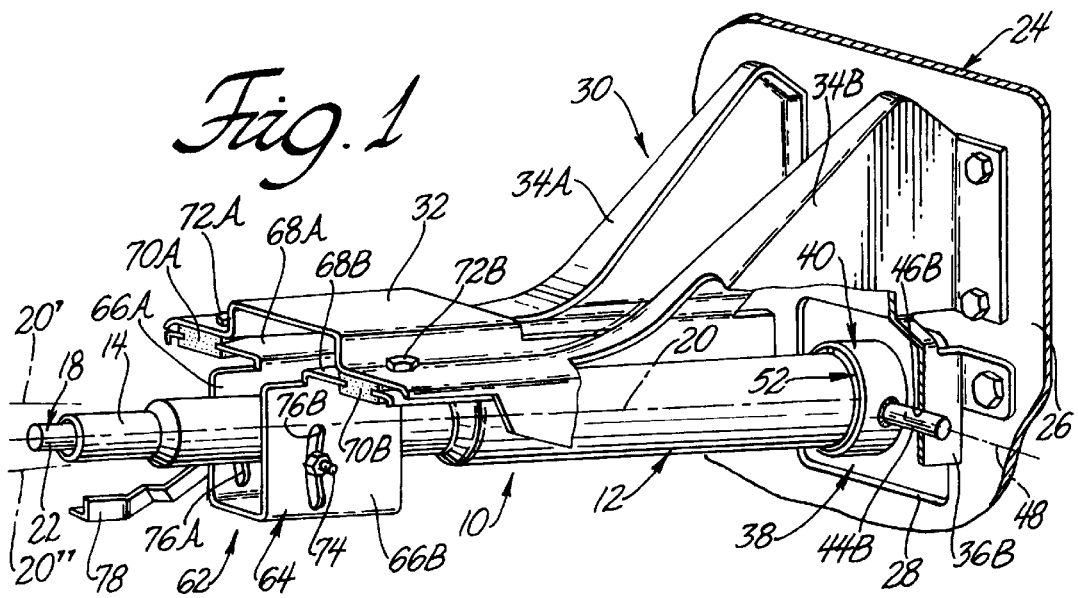
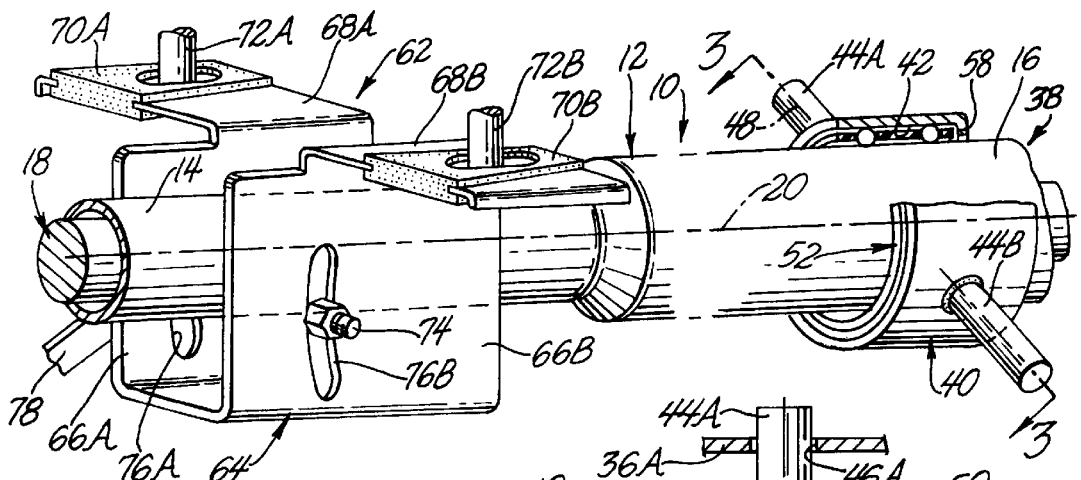
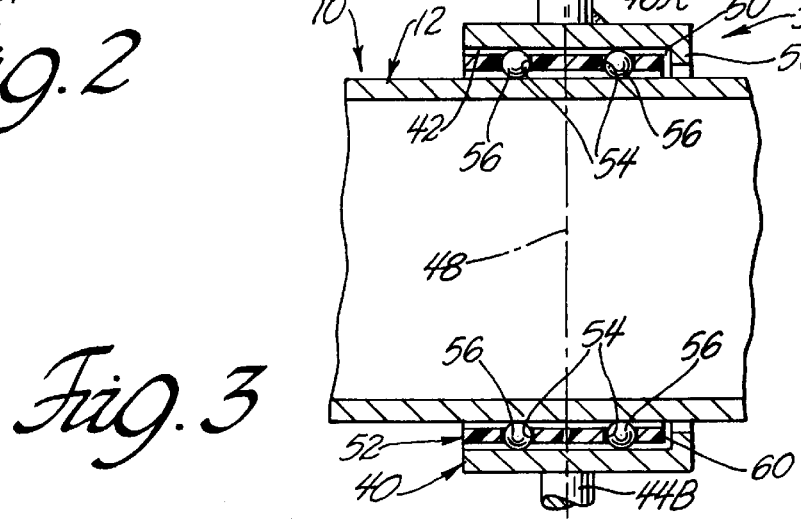

ENERGY ABSORBER FOR STEERING COLUMN

TECHNICAL FIELD

This invention relates to energy absorbing steering columns for motor vehicles.

BACKGROUND OF THE INVENTION

U.S. Pat. No. 3,392,599, issued Jul. 16, 1968 and assigned to the assignee of this invention, describes an energy absorbing steering column for a motor vehicle including a tubular lower mast jacket, a tubular upper mast jacket telescopically overlapping the lower mast jacket, and an energy absorber between the upper and the lower mast jackets. The energy absorber includes a plastic ball sleeve and a plurality of steel spheres loosely received in apertures in the ball sleeve and interference fitted between the upper and the lower mast jackets. An impact on the steering column induces linear telescopic collapse of the upper mast jacket over the lower mast jacket. The steel spheres plastically deform the upper and the lower mast jackets by rolling tracks in each thereby to convert into work a fraction of the kinetic energy of the impact on the steering column. An energy absorber according to this invention is a novel alternative to the energy absorber described in the aforesaid U.S. Pat. No. 3,392,599.

SUMMARY OF THE INVENTION

This invention is a new and improved energy absorber between a body of a motor vehicle and a mast jacket of a steering column of the motor vehicle supported on the body for linear translation through a collapse stroke in response to an impact on the steering column. The energy absorber includes a yoke on the vehicle body pivotable about a lateral centerline of the vehicle body, a linear bore in the yoke surrounding the steering column mast jacket, a ball sleeve between the mast jacket and the linear bore in the yoke, a plurality of steel spheres interference fitted between the mast jacket and the linear bore in the yoke and loosely received in apertures in the ball sleeve, and an annular lip on the yoke obstructing the annulus between the mast jacket and the linear bore. The interference fit of the steel spheres between the mast jacket and the linear bore in the yoke yields a rigid, lash-free connection between the vehicle body and a lower end of the steering column mast jacket. An impact on the steering column induces linear translation of the mast jacket through the linear bore in the yoke. The ball sleeve is trapped in the linear bore in the yoke by the annular lip on the yoke. The steel spheres are prevented from rolling between the mast jacket and linear bore in the yoke by the ball sleeve and are therefore caused to plastically deform the mast jacket by plowing tracks therein to convert into work a fraction of the kinetic energy of the impact on the steering column. The interference fit of the steel spheres between the mast jacket and the linear bore in the yoke prevents tipping of the mast jacket relative to the yoke and induces up and down pivotal movement of the yoke as a unit with the steering column to prevent binding of the mast jacket in the linear bore during linear translation of the mast jacket.

BRIEF DESCRIPTION OF THE DRAWINGS

FIG. 1 is a fragmentary, partially broken-away, perspective view of a motor vehicle steering column having an energy absorber according to this invention;

FIG. 2 is an enlarged, partially broken-away view of a portion of FIG. 1; and

FIG. 3 is a sectional view taken generally along the plane indicated by lines 3—3 in FIG. 2.

DESCRIPTION OF THE PREFERRED EMBODIMENT

Referring to FIGS. 1–2, a generally schematically represented motor vehicle steering column 10 includes a tubular mast jacket 12 having an upper end 14 and a lower end 16, FIG. 2. The mast jacket is made of a plastically deformable material such as mild carbon steel. A steering shaft 18 is supported on the mast jacket for rotation about a longitudinal centerline 20 of the mast jacket 12 which coincides with the longitudinal centerline of the steering column. A steering hand wheel, not shown, is attached to an end 22 of the steering shaft 18 outboard of the upper end 14 of the mast jacket. An opposite end, not shown, of the steering shaft 18 is connected to a steering gear of the motor vehicle for steering the vehicle in conventional fashion in response to rotation of the steering hand wheel. Thrust bearings, not shown, transfer forces attributable to an impact on the steering hand wheel to the mast jacket 12.

A fragmentarily illustrated body structure 24, FIG. 1, of the motor vehicle includes a vertical panel 26 at the forward extremity of a passenger compartment, not shown, of the motor vehicle. The vertical panel has a window 28 therein through which the steering column traverses the plane of the vertical panel. The body structure further includes a bracket 30 bolted to the vertical panel 26 having a horizontal side 32 and a pair of integral supports 34A,34B. The horizontal side 32 is flanked on opposite sides by a pair of depending vertical sides 36A,36B of the bracket 30 integral with the horizontal side and with the supports 34A,34B.

An energy absorber 38 according to this invention includes a yoke 40 in the form of a steel sleeve having a linear bore 42 therethrough and a pair of trunnions 44A,44B welded thereon. The trunnions 44A,44B seat in a pair of schematically represented sockets 46A,46B in the vertical sides 36A,36B, respectively, of the bracket 30 and cooperate with the sockets in supporting the yoke on the body structure of the motor vehicle for pivotal movement about a lateral centerline 48 of the body structure.

The lower end 16 of the mast jacket 12 of the steering column extends through the linear bore 42 in the yoke 40 with an annular clearance 50 therebetween, FIG. 3. A ball sleeve 52 of the energy absorber 38 is disposed around the mast jacket 12 in the annular clearance 50 and includes a plurality of apertures 54. The ball sleeve is preferably made of plastic. A plurality of spheres 56 are loosely received in respective ones of the apertures 54 in the ball sleeve and are interference fitted between the linear bore 42 in the yoke and the mast jacket 12. The spheres 56 are preferably made of steel having a hardness exceeding the hardness of the material from which the mast jacket 12 is made. An annular lip 58 integral with the yoke 40 obstructs the annular clearance 50 and defines a seat for an end 60 of the plastic ball sleeve 52. The interference fit of the steel spheres between the mast jacket and the linear bore in the yoke yields a rigid, lash-free connection between the vehicle body and the lower end 16 of the steering column mast jacket 12.

As seen best in FIGS. 1–2, a generic, schematically illustrated clamp 62 is disposed between the bracket 30 and the mast jacket 12 and includes a box-shaped bracket 64 having a pair of vertical sides 66A,66B on opposite sides of the mast jacket near the upper end 14 thereof and a pair of horizontal flanges 68A,68B extending outward from the vertical sides 66A,66B. A pair of capsules 70A,70B are seated in a corresponding pair of notches in the horizontal flanges 68A,68B of the bracket 64 and retained therein by plastic shear pins, not shown. A pair of hanger bolts 72A, 72B, FIG. 1, rigidly attached to the horizontal side 32 of the bracket 30 extend down through slots in corresponding ones of the capsules 70A,70B. Fasteners, not shown, on the hanger bolts below the capsules rigidly clamp the capsules to the horizontal side 32 of the bracket 30 and, consequently, to the vehicle body.

The clamp 62 further includes a cross bolt 74 on the mast jacket 12 projecting through a pair of arc-shaped slots 76A,76B in the vertical sides 66A,66B of the bracket 64 centered about the lateral centerline 48 and a lever 78 which rotates the cross bolt. When the cross bolt 74 is loose between the vertical sides 66A,66B of the bracket 64, the mast jacket 12 is rake adjustable, i.e. is pivotable up and down about the lateral centerline 48 between a pair of limit positions 20',20", FIG. 1. When the cross bolt 74 is tight between the vertical sides 66A,66B, the mast jacket 12 is rigidly clamped to the box-shaped bracket 64 and, consequently, the vehicle body.

Force attributable to an impact on the aforesaid steering hand wheel toward the vertical panel 26 is transferred to the mast jacket 12 through the aforesaid thrist bearings between the steering shaft 18 and the mast jacket. Such force fractures the aforesaid shear pins between the flanges 68A,68B and the capsules 70A,70B to release the mast jacket for linear translation in an energy absorbing collapse stroke in the direction of the longitudinal centerline 20 of the steering column.

The lip 58 on the yoke 40 traps the ball sleeve 52 in the annular clearance 50. As a consequence of the interference fit of the steel spheres 56 between the linear bore 42 and the mast jacket 12, the steel spheres will roll in the direction of linear translation of the mast jacket relative to the yoke 40 and induce linear translation of the ball sleeve in the same direction if there is any clearance between the end 60 of the ball sleeve and the lip 58 on the yoke. When the end 60 of the ball sleeve seats on the annular lip, the latter arrests linear translation of the ball sleeve. If there is no clearance initially, the lip prevents linear translation of the ball sleeve from commencing. Accordingly, the lip 58 prevents dislodgment of the ball sleeve from the annular clearance 50 between the linear bore 42 and the mast jacket 12.

With the ball sleeve thus trapped, the force attributable to the impact on the steering column is reacted to the vehicle body through the mast jacket 12, the steel spheres 56, the yoke 40, and the trunnions 44A,44B on the yoke. At the same time, the ball sleeve 52 prevents the steel spheres from rolling between the linear bore and the mast jacket so that when the force attributable to the impact exceeds the yield strength of the mast jacket, the steel spheres plastically deform the mast jacket 12 by plowing linear tracks therein. Such plastic deformation provides controlled resistance to linear collapse of the mast jacket 12 relative to the yoke 40 and effects conversion into work of a fraction of the kinetic energy of the impact on the steering column. To maximize the effectiveness of the steel spheres 56, the apertures 54 in succeeding rows in the ball sleeve are preferably staggered to prevent two spheres from plowing the same linear track.

Importantly, because the steel spheres 56 prevent tipping of the mast jacket 12 relative to the yoke 40, the yoke pivots up and down with the steering column during an energy absorbing collapse stroke of the mast jacket and renders the energy absorber 38 insensitive to bending moments attributable to forces not parallel to the longitudinal centerline 20 of the steering column. Additionally, the relative structural simplicity of the energy absorber 38 contributes to manufacturing economy and design flexibility in that the yoke 40, the ball sleeve 52, and the steel spheres 56 are all relatively easy to fabricate and to modify to achieve different energy absorbing performance characteristics.

Having thus described the invention, what is claimed is:

1. An energy absorber for a motor vehicle steering column comprising:

a tubular mast jacket on said steering column made of a metal subject to plastic deformation, a yoke, mounting means operative to mount said yoke on a body structure of said motor vehicle for pivotal movement about a lateral centerline of said body structure, a linear bore in said yoke surrounding said tubular mast jacket of said steering column and cooperating with said tubular mast jacket in defining an annular clearance between said linear bore in said yoke and said tubular mast jacket, a tubular ball sleeve in said annular clearance having a plurality of apertures therein, a plurality of spheres made of a material harder than said tubular mast jacket loosely received in respective ones of said apertures in said tubular ball sleeve and interference fitted between said linear bore in said yoke and said tubular mast jacket so that said spheres cooperate in connecting said tubular mast jacket to said yoke for pivotal movement as a unit therewith about said lateral centerline and in preventing tipping of said tubular mast jacket relative to said linear bore during linear translation of said tubular mast jacket through said linear bore in an energy absorbing collapse direction, and an annular lip on said yoke obstructing said annular clearance and defining a seat for an end of said tubular ball sleeve to prevent dislodgment of said ball sleeve from said annular clearance during linear translation of said mast jacket through said linear bore in said energy absorbing collapse direction, said tubular ball sleeve preventing said spheres from rolling between said mast jacket and said linear bore in said yoke so that said spheres plastically deform said mast jacket by plowing linear tracks therein to convert into work a fraction of the kinetic energy of said impact on said steering column during linear translation of said mast jacket through said linear bore in said energy absorbing collapse direction.

2. The energy absorber recited in claim 1 wherein:

each of said spheres is a steel sphere, and said ball sleeve is a plastic ball sleeve.

3. The energy absorber recited in claim 2 wherein said mounting means operative to mount said yoke on said body structure of said motor vehicle for pivotal movement about said lateral centerline of said body structure comprises:

a pair of trunnions on said yoke, and a pair of sockets on said body structure receiving respective ones of said pair of trunnions.

* * * * *